United States Patent
Wooldridge et al.

(10) Patent No.: US 10,581,991 B1
(45) Date of Patent: *Mar. 3, 2020

(54) ANALYZING TRACKING REQUESTS GENERATED BY CLIENT DEVICES BASED ON METADATA DESCRIBING WEB PAGE OF A THIRD PARTY WEBSITE

(71) Applicant: Facebook, Inc., Menlo Park, CA (US)

(72) Inventors: Tobias Henry Wooldridge, Seattle, WA (US); Christine Jinha Hwang, La Crescenta, CA (US); Aleksey Sergeyevich Fadeev, Seattle, WA (US); Michael Scott Sulak, San Francisco, CA (US); Amlesh Jayakumar, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/882,319

(22) Filed: Jan. 29, 2018

(51) Int. Cl.
*G06F 15/173* (2006.01)
*H04L 29/08* (2006.01)
*G06N 20/00* (2019.01)
*G06F 16/95* (2019.01)
*G06Q 50/00* (2012.01)

(52) U.S. Cl.
CPC .............. *H04L 67/22* (2013.01); *G06F 16/95* (2019.01); *G06N 20/00* (2019.01); *H04L 67/02* (2013.01); *H04L 67/20* (2013.01); *G06Q 50/01* (2013.01)

(58) Field of Classification Search
CPC ......... H04L 67/22; H04L 67/02; H04L 67/20; G06F 16/95; G06N 20/00; G06Q 50/01

USPC .................................................. 709/224, 203
See application file for complete search history.

(56) References Cited

U.S. PATENT DOCUMENTS

| | | | |
|---|---|---|---|
| 7,284,041 B2 | 10/2007 | Nakatani et al. | |
| 9,367,814 B1 | 6/2016 | Lewis et al. | |
| 9,740,895 B1 * | 8/2017 | Liu | G06Q 10/087 |
| 9,882,999 B1 * | 1/2018 | Xu | H04L 67/22 |
| 10,067,987 B1 * | 9/2018 | Khanna | H04L 67/10 |
| 2002/0082901 A1 | 6/2002 | Dunning et al. | |

(Continued)

OTHER PUBLICATIONS

Facebook, Inc., "Conversion Tracking—Facebook Pixel," Date Unknown, five pages. [Online] [Retrieved Nov. 30, 2017] Retrieved from the Internet <URL:https://developers.facebook.com/docs/facebook-pixel/pixel-with-ads/conversion-tracking>.

*Primary Examiner* — Philip B Tran
(74) *Attorney, Agent, or Firm* — Fenwick & West LLP

(57) ABSTRACT

An online system receives tracking requests from client devices interacting with a website. The online system analyzes user interactions with websites using the tracking requests. The online system predicts an accurate label for the web page that caused the tracking request to be generated. The online system uses the accurate label for generating reports describing user interactions with the website. The online system predicts the label of a web page received by the client device based on metadata extracted from markup language documents by the client device and provided to the online system via tracking requests. Examples of metadata extracted from markup language documents include labels and description of widgets in the web page that triggered the tracking request from the client device. The online system generates reports describing the quality of the tracking requests.

20 Claims, 5 Drawing Sheets

(56) References Cited

U.S. PATENT DOCUMENTS

| | | | |
|---|---|---|---|
| 2006/0015755 A1* | 1/2006 | Jaffe | G06Q 30/02 |
| | | | 713/193 |
| 2007/0239701 A1 | 10/2007 | Blackman et al. | |
| 2008/0104043 A1 | 5/2008 | Garg et al. | |
| 2009/0052330 A1 | 2/2009 | Matsunaga et al. | |
| 2009/0070409 A1* | 3/2009 | Clayton | G06F 9/542 |
| | | | 709/203 |
| 2009/0164378 A1 | 6/2009 | West et al. | |
| 2012/0215684 A1 | 8/2012 | Kidron | |
| 2014/0059219 A1 | 2/2014 | Seolas et al. | |
| 2014/0168453 A1* | 6/2014 | Shoemake | H04N 5/23206 |
| | | | 348/207.11 |
| 2014/0223099 A1 | 8/2014 | Kidron | |
| 2015/0120462 A1* | 4/2015 | Zhang | G06Q 30/0267 |
| | | | 705/14.64 |
| 2016/0042388 A1 | 2/2016 | Chater et al. | |
| 2016/0078225 A1 | 3/2016 | Ray et al. | |
| 2016/0080399 A1 | 3/2016 | Harris et al. | |
| 2016/0080417 A1 | 3/2016 | Thomas et al. | |
| 2016/0080418 A1 | 3/2016 | Ray et al. | |
| 2016/0080419 A1 | 3/2016 | Schiappa et al. | |
| 2016/0080420 A1 | 3/2016 | Ray et al. | |
| 2016/0086215 A1 | 3/2016 | Wang et al. | |
| 2016/0191465 A1 | 6/2016 | Thomas et al. | |
| 2016/0191476 A1 | 6/2016 | Schütz et al. | |
| 2017/0068733 A1 | 3/2017 | Tober et al. | |
| 2017/0103177 A1 | 4/2017 | Iliff et al. | |
| 2017/0331909 A1* | 11/2017 | Iadonisi | H04L 67/22 |
| 2019/0205971 A1* | 7/2019 | Deo | G06F 16/951 |

\* cited by examiner

ANALYZING TRACKING REQUESTS GENERATED BY CLIENT DEVICES BASED ON METADATA DESCRIBING WEB PAGE OF A THIRD PARTY WEBSITE

BACKGROUND

This disclosure relates generally to analyzing tracking requests received by an online system from client devices rendering web pages received from a website, and in particular to determining accuracy of the information provided by client devices via tracking requests to an online system.

Online systems such as social networking systems track user interactions with the online system so that they can provide features and content that is relevant to each user. The online system logs user interactions with the online system for analysis. However, online systems also prefer to monitor user interactions with external systems such as third party websites. An online system may not have direct access to logs of the external website. However, a client device can send a tracking request to the online system describing user interactions between the client device and the external website.

An external website provides instructions with the web page that are executed by the client device when the client device renders the web page. These instructions cause the tracking request to be generated for sending information to the online system. However, sometimes external websites provide inaccurate data (e.g., label the web page incorrectly or report the wrong event, fail to label the web page at all, report duplicate events, etc.). This may happen due to defects in the instructions provided by a web page to the client device for generating the tracking requests. Conventional techniques fail to detect such errors in the information reported by client devices via tracking requests. As a result, a client device provides inaccurate information to the online system. Any analysis performed by the online system based on such inaccurate data reported by a client device is inaccurate and results in the online system making incorrect inferences and taking wrong actions based on the inferences, for example, sending irrelevant content to a user.

SUMMARY

An online system receives tracking requests from client devices interacting with a website to analyze user interactions with the website. The website provides instructions with web pages sent to a client device that cause the client device to send tracking instructions to the online system. A tracking request provides a label identifying the webpage that caused the tracking request to be generated. A tracking request may incorrectly identify a web page, for example, if the instructions provided by the website for the web page include errors. The online system uses a machine learning model to predict an accurate label for the web page that caused the tracking request to be generated.

The online system extracts a feature vector for a tracking request. The feature vector comprises features based on metadata describing widgets displayed on the web page. For example, the metadata may describe fields of a widget specified in a markup language document of the web page such as a label, a name, or a description of the widget. The online system provides the feature vector as input to a machine learning model for predicting a label identifying the web page. In an embodiment, the machine learning model is configured to generate a score indicating an accuracy with which an input label identifies a web page of an input tracking request. The online system uses the machine learning model to predict accurate labels of the web pages received by the client devices. The online system uses the predicted labels to generate accurate reports describing user interactions with the third party website.

BRIEF DESCRIPTION OF THE DRAWINGS

The teachings of the embodiments can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
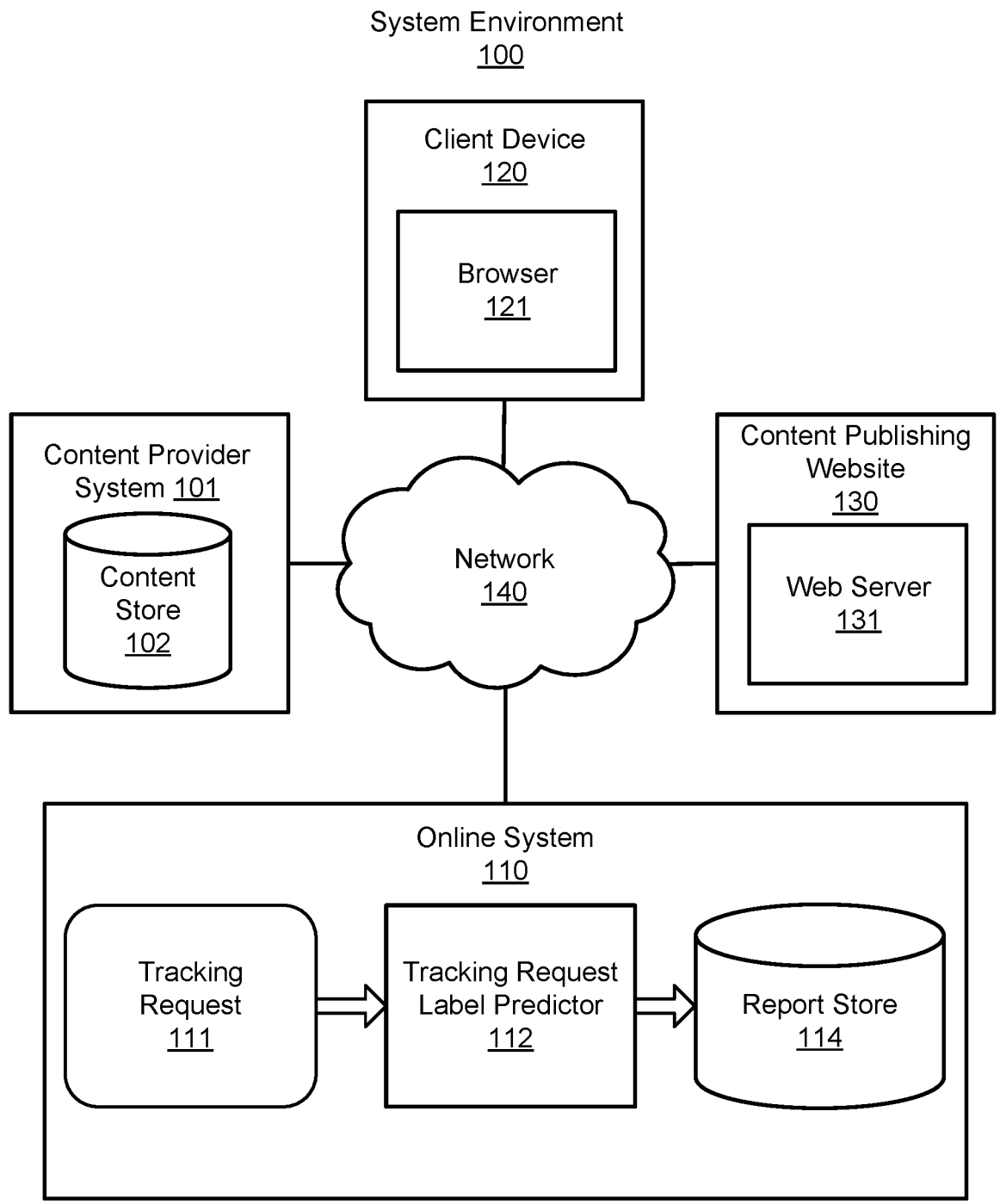
FIG. 1 is a block diagram of a system environment in which the online system operates, in accordance with an embodiment.

FIG. 1 is a block diagram of a system environment 100 in which an online system 110 operates, in accordance with an embodiment. In the embodiment illustrated in FIG. 1, the system environment 100 includes a content provider system 101, an online system 110, client devices 120, a content publishing website 130, and a network 140. The content provider system 101 includes a content store 102 for storing content items. The content publishing website 130 includes a web server 131 for delivering content items to users via client devices 120. The client devices 120 include a browser 121 that provides an interface through which users can access a content publishing website 130. The online system 110 includes, in part, a tracking request 111 signal, a tracking request label predictor 112, and a report store 114.

The content provider system 101 shown in FIG. 1 provides electronic media content items to the online system 110 for delivering to the client devices 120. Alternatively, the content provider system 101 may provide the content to a content publishing website 130 for providing to users of the content publishing website 130. The content provider system 101 may be associated with a user, an enterprise, an organization, or a group, for example, a political campaign, a university, a corporation, the government, etc. In an embodiment, a content item is a sponsored content item for which a content provider associated with the content provider system 101 provides remuneration to the online system (or a content publisher) for delivery of the content items to an online audience via the client devices 120. The term "content item" refers to "electronic media content item" wherever it appears herein. Content items may be images, text paragraphs, video clips, audio clips, hyperlinks, online forms, etc. Examples of sponsored content items include online advertisements.

The content store 102 shown in FIG. 1 is used by the content provider system 101 for storing content items. The content store 102 may be organized as a database, table, file, etc., stored on one or more of removable or non-removable memory cards, tape cassettes, zip cassettes, and computer hard drives. The content store 102 may include multiple data fields, each describing one or more attributes of the content items. The content store 102 may include, for a single content item—a content provider identifier (e.g., whether the content item is provided by the government), a list of policies and one or more weights regarding delivering of the content item to the client devices 120 and the content publishing website 130, one or more threshold rates of client interactions, a list of desired client interactions, such as clicking on a link in a content item, closing a content item using a close button on a browser of a client device, sharing a content item from a first client device to a second client device, performing a transaction associated with a content item, and so on. The content store 102 may also store for all content items—the number of content items to be delivered in a given time interval, a length of a time interval during which the content items are expected to be delivered, an estimate of a total number of deliveries of content items during the time interval, and so on. A delivery of a content item refers to an instance of a particular content item being delivered to a user. For example, if the same content item is delivered to multiple users or multiple times to the same user, each instance is referred to as a delivery.

The content publishing website 130 can be any website that provides content to users. For example, the content publishing website 130 may be a digital publisher of newspapers, e-books, digital magazines, digital libraries, digital catalogues, etc. The content publishing website 130 may distribute content including web pages, videos, and text, for example, books, magazines, and newspapers to users through tablet reading devices, distribution via the Internet (in the form of the browser 121 accessible by the client devices 120), other interactive media, etc. The content publishing web site 130 is a collection of web pages, including multimedia content, typically identified with a common domain name, and published on at least one web server 131. The content publishing website 130 may be accessible via a public Internet Protocol (IP) network, such as the Internet, or a private local area network (LAN), by referencing a uniform resource locator (URL) that identifies the site. The content publishing website 130 can have many functions and can be used in various fashions—a personal website, a commercial website for a company, a government website, a non-profit organization website, website for entertainment, social networking system, a website providing news or educational content, private website such as a company's website for its employees typically a part of an intranet, etc.

In one embodiment, the content publishing website 130 can embed tracking instructions for generating tracking requests within one or more web pages of the content publishing website 130 in order to track user interactions. In an embodiment, the tracking instructions are associated with one or more tracking pixels. A tracking pixel is a portion of a web page, for example, a segment of HTML code that produces a transparent 1×1 image, an iframe, or other suitable object that may be embedded in a web page sent to a client device by the content publishing website 130. A tracking pixel is activated, or triggered, when a web page is loaded (e.g., rendered) into a user's browser 121 on a client device 120 for viewing. When a tracking pixel is rendered, the HTML code of the tracking pixel sends a tracking request, to the online system 110. The tracking request may include information describing the web page being rendered, for example, a label describing the web page, metadata describing values, data, or widgets presented to the user by the web page, and so on. The tracking request may extract the metadata describing widgets from the markup language of the webpage. The online system 110 receives the tracking request. Tracking requests convey to the online system 110 information describing user interaction of a user with a content publishing web site 130 or any third party website external to the online system. For example, a tracking pixel may trigger when the client device renders a web page of a shopping website as a user is browsing products within the website. When the tracking pixel is rendered, the client device sends a tracking request to the online system 110 identifying the user, the product the user was browsing, and any other metadata.

The client devices 120 shown in FIG. 1 can be used by online system 110 users for interacting with the online system 110 and the content publishing web site 130. Each client device 120 is a computing device capable of receiving client input as well as transmitting and/or receiving data via the network 140. The client device 120 may be a conventional computer system, such as a desktop or laptop computer. Alternatively, the client device 120 may be a device having computer functionality, such as a personal digital assistant (PDA), a mobile telephone, a smartphone or another suitable device. The client device 120 may execute an application allowing a user of the online system 110 to interact with the online system 110 and/or the content publishing website 130. In one example, the client device 120 executes a browser application 121 to enable interaction between the client device 120 and the online system 110 via the network 140. In one example, the client device 120 interacts with the content publishing website 130 through an application programming interface (API) running on a native operating system of the client device 120, such as IOS® or ANDROID™. A user may download content items from the online system 110 to the client device 120 using the browser 121. In addition, a user may interact with the content items by clicking on a link in a content item, filling in client information into an online form, closing the content item using a "close window" button on the browser 121 or on the client device 120, etc.

The online system 110 receives tracking requests 111 from client devices 120, analyzes the tracking requests for accuracy, and generates a score associated with the overall quality of the information provided by the client device 120 in the tracking requests 111. In one embodiment, the online system 110 provides tracking pixel markup language code, for example, HTML code to content publishing websites 130 that are interested in providing information describing user interactions with the content publishing website 130 to the online system 110. The online system 110 may generate reports based on the data received with tracking requests and provide to users, for example, administrators of the content publishing website 130. For example, if the online system 110 is a social networking system, the online system 110 may generate reports that combine demographic information of users that is stored in the social networking system with user interaction patterns of the content publishing website 130. This allows the content publishing website 130 to analyze how users having different demographics interact with the content publishing website 130.

In another embodiment, content publishing websites 130 may generate their own tracking pixel HTML code and associated pixel data and provide the online system 110 with tracking requests as the tracking pixel is rendered on client devices of users. In the embodiment illustrated in FIG. 1, the online system 110 comprises, in part, a tracking request 111, a tracking request label predictor 112, and a report store 114.

A tracking request 111 is sent to the online system 110 from a content publishing website 130 for each instance that a tracking pixel placed within a web page of a content publishing website 130 is rendered by the client device 120. Each tracking request 111 contains a label identifying the type of web page on which the tracking pixel is embedded (e.g., a shopping cart page, a checkout page, a product page, a registration page, etc.) and metadata extracted from the markup language document of the web page associated with each tracking request (e.g., labels describing widgets displayed on the web page, metadata describing forms submitted, descriptions of form fields displayed on the web page, whether a form field is a password, etc.). The metadata extracted from the markup language document is also referred to herein as the markup language document metadata. Because the pixel data contained within each tracking request may be generated by a content publishing website 130, labels may not accurately reflect the type of web page from which the tracking request was sent. For example, a tracking pixel embedded within a registration web page of a content publishing website 130 may be incorrectly labeled as a checkout web page. Accordingly, the tracking pixel of the registration web page may be triggered by a client device 120 which sends a tracking request 111 to the online system 110 identifying the registration web page as a checkout web page, thereby providing an incorrect label. In an embodiment, the online system 110 uses the markup language document metadata received in the tracking request (e.g., keywords used as labels of widgets displayed on the web page) to determine whether the label is correct. Furthermore, if the online system 110 determines that the label is incorrect, the online system 110 generates a correct label to describe the web page.

The tracking request label predictor 112 receives a tracking request 111 from a content publishing website 130 as input and predicts a label identifying the web page on which it is embedded. The tracking request label predictor 112 can use the markup language document metadata included with the tracking request 111 to identify contextual information associated with the tracking pixel triggering event. If the markup language document metadata provided in the tracking request 111 indicates that the web page may be incorrectly labeled, the tracking request label predictor 112 predicts the correct label based on features derived from the markup language document metadata, such as whether a certain type of field was present on the web page (e.g., password filed, submit button, etc.), number of fields of different types, and/or whether a web page has a CVV (card verification value) field displayed, for example. Upon predicting a label that correctly identifies the web page, the online system 110 store the predicted label in the label mapping table 250. The online system 110 may generate a label mapping table 250 that provides a mapping from incorrect labels to the predicted correct label. The label mapping table 250 may be used internally by the online system 110, or provided to the content publishing website 130. In an embodiment, if the online system 110 generates reports describing the content publishing website 130, the online system 110 may convert incorrect labels to correct labels based on the label mapping table 250 to generate an accurate report. These reports are stored in the report store 114. The tracking request label predictor 112, label mapping table 250, and the report store 114 will be discussed further in the following section.

The content provider system 101, content publishing website 130, client devices 120, and the online system 110 are configured to communicate via the network 140 shown in FIG. 1, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 110 as disclosed provides benefits and advantages that include increased engagement of users with content items. Other advantages of the system include efficient delivery of content to users by eliminating delivery of content items in cases where users are unlikely to interact with the content items, faster processing of the online system since fewer content items are transmitted, less power consumption, lower latency in content transmission, less data transmitted over the network, etc.

System Architecture

Figure 2:
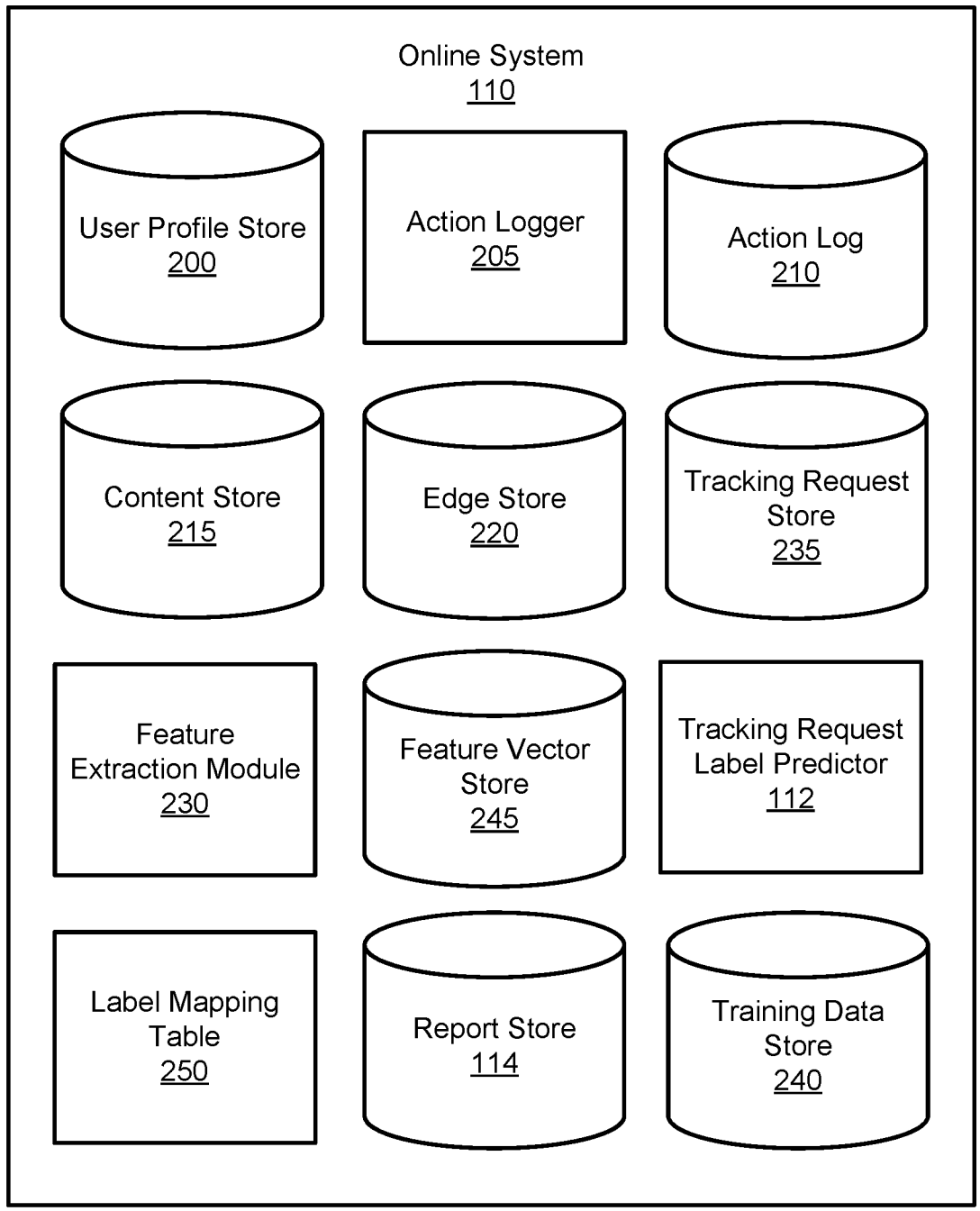
FIG. 2 is a block diagram of a system architecture of the online system, in accordance with an embodiment.

FIG. 2 is a block diagram of an online system 110 according to one embodiment. In the embodiment illustrated in FIG. 2, the online system 110 includes a user profile store 200, an action logger 205, an action log 210, a content store 215, an edge store 220, a tracking request store 235, a feature extraction module 230, a feature vector store 245, a tracking request label predictor 112, a training data store 240, a label mapping table 250, and a report store 114. In other embodiments, the online system 110 may include additional, fewer, or different components for various applications. Conventional components such as network interfaces, security functions, load balancers, failover servers, management and network operations consoles, and the like are not shown so as to not obscure the details of the system architecture.

Each user of the online system 110 is associated with a user profile, which is stored in the user profile store 200. A user profile includes declarative information about the user that was explicitly shared by the user and may also include profile information inferred by the online system 110. In one embodiment, a user profile store 200 of an online system user includes multiple data fields, each describing one or more attributes of the user. Examples of information stored in a user profile store 200 include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system 110 user displayed in an image. A user profile in the user profile store 200 may also maintain references to actions by the corresponding user performed on content items in the action log 210.

While user profiles in the user profile store 200 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The action logger 205 receives communications about user actions internal to and/or external to the online system 110, populating the action log 210 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 210.

The action log 210 may be used by the online system 110 to track user actions on the online system 110, as well as actions on content publishing websites 130 that communicate information to the online system 110. Users may interact with various objects on the online system 110, and information describing these interactions is stored in the action log 210. Examples of interactions with objects include: viewing videos, commenting on posts, sharing links, checking-in to physical locations via a mobile device, accessing content items, and any other suitable interactions. Additional examples of interactions with objects on the online system 110 that are included in the action log 210 include: viewing videos posted by a user's connections in the online system 110, commenting on a photo album, communicating with a user, establishing a connection with an object, joining an event, joining a group, creating an event, authorizing an application, using an application, expressing a preference for an object ("liking" the object), and engaging in a transaction. Additionally, the action log 210 may record a user's interactions with sponsored content on the online system 110 as well as with other applications operating on the online system 110. In some embodiments, data from the action log 210 is used to infer interests or preferences of a user, augmenting the interests included in the user's user profile store 200 and allowing a more complete understanding of user preferences.

In one embodiment, the edge store 220 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. In one embodiment, the user profile store 200 stores data describing the connections between different users of the online system 110, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 110 may be called a "social graph."

Other edges are generated when users interact with objects in the online system 110, such as expressing interest in a page on the online system 110, sharing a link with other users of the online system 110, viewing videos posted by other users of the online system 110, and commenting on posts or videos provided by other users of the online system 110. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 110, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

The edge store 220 also stores information about edges, such as affinity scores for objects, interests, and other users. In one embodiment, affinity scores, or "affinities," are computed by the online system 110 over time to approximate a user's interest in an object or another user in the online system 110 based on the actions performed by the user. A user's affinity may be computed by the online system 110 over time to approximate a user's affinity for an object, interest, and other users in the online system 110 based on the actions performed by the user. Multiple interactions between a user and a specific object may be stored as a single edge in the edge store 220, in one embodiment. Alternatively, each interaction between a user and a specific object is stored as a separate edge.

The content store 215 stores objects that represent various types of content. Examples of content represented by an object include a video, page post, status update, photograph, link, shared content item, gaming application achievement, check-in event at a local business, brand page, or any other type of content. Online system 110 users may create objects stored by the content store 215, such as status updates, photos tagged by users to be associated with other objects in the online system 110, events, groups, or applications. In some embodiments, objects are received from content publishing websites 130 and placed in the content store 215. These objects may represent sponsored content campaigns provided to the content publishing website 130 by a content provider system 101.

The tracking request store 235 receives data corresponding to one or more tracking requests 111 sent from client devices responsive to rendering web pages of a content publishing website 130. In an embodiment, the online system 110 receives and stores a sequence of tracking requests 111 associated with a user session. Here, a user session may correspond to a sequence of web pages visited by a user on a particular content publishing website 130 from the time the user connects with the content publishing website 130 to the time the use completes the interactions (e.g., when user performs a log out or check out operation). Each tracking request 111 within a user session receives its own entry in the tracking request store 235, and contains data (e.g., URL, label, and metadata) that describe the web page that triggered the tracking request 111 from the client device 120.

Figure 3:
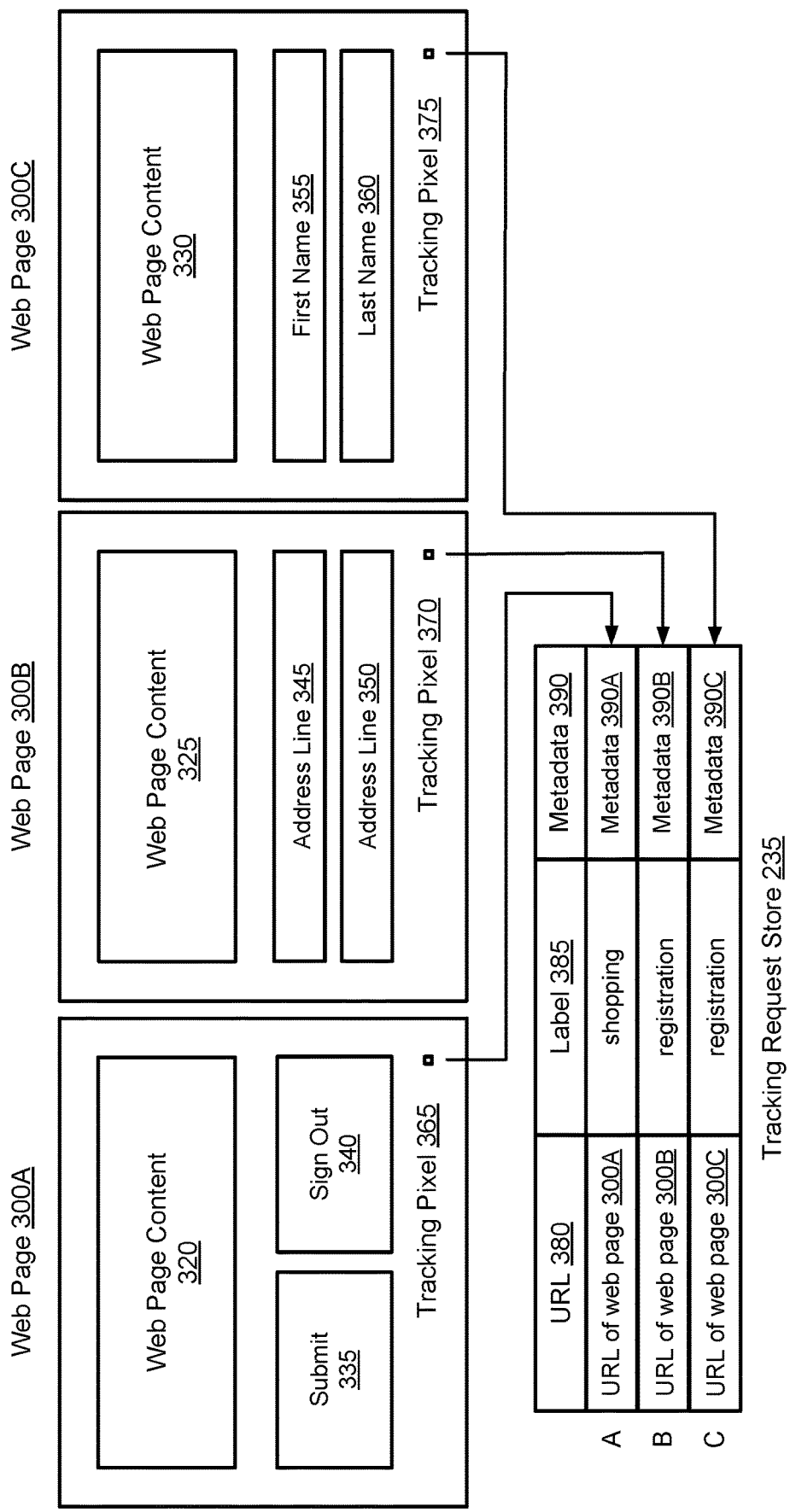
FIG. 3 illustrates an example use case of receiving and storing tracking requests, in accordance with an embodiment.

In one embodiment, such as that illustrated in FIG. 3, each entry in the tracking request store 235 (e.g., entries A, B, and C) includes a label 385 that was provided by the web page rendered by the client device 120 and data including a URL 380 of the web page rendered by the client device 120 and markup language document metadata 390 attributes.

These markup language document metadata 390 attributes describe various elements in the markup language document received by the client device 120 from the content provider system, such as metadata describing widgets displayed on the web page by the client device 120. Other embodiments may include additional data that describe a product size, color, and SKU number, in addition to a label 385. This data may also include the identification of the user that generated the user session if the content publishing website 130 requires users to login. In yet another embodiment, data for an entry in the tracking request store 235 may also include one or more cookies stored in the client device.

The feature extraction module 230 identifies tracking request 111 entries in the tracking request store 235 and generates a feature vector for each entry. Each feature vector is comprised of features extracted from a tracking request 111. A feature may be based on markup language document metadata provided by the client device with a tracking request described in the tracking request store 235. For example, a feature vector might contain features such as keywords used as labels of widgets displayed on the web page, types of form fields displayed in the web page, number of distinct form fields displayed on the web page, presence of a value entered into a form field by a user (not the actual value entered), type of value entered into a form field (e.g., numeric, alphabetic, date, and the like). These features provide the online system 110 with additional context in determining if web pages within a given user session on a content publishing website 130 are labeled correctly. Each feature vector generated by the feature extraction module 230 is stored in the feature vector store 245.

Figure 4:
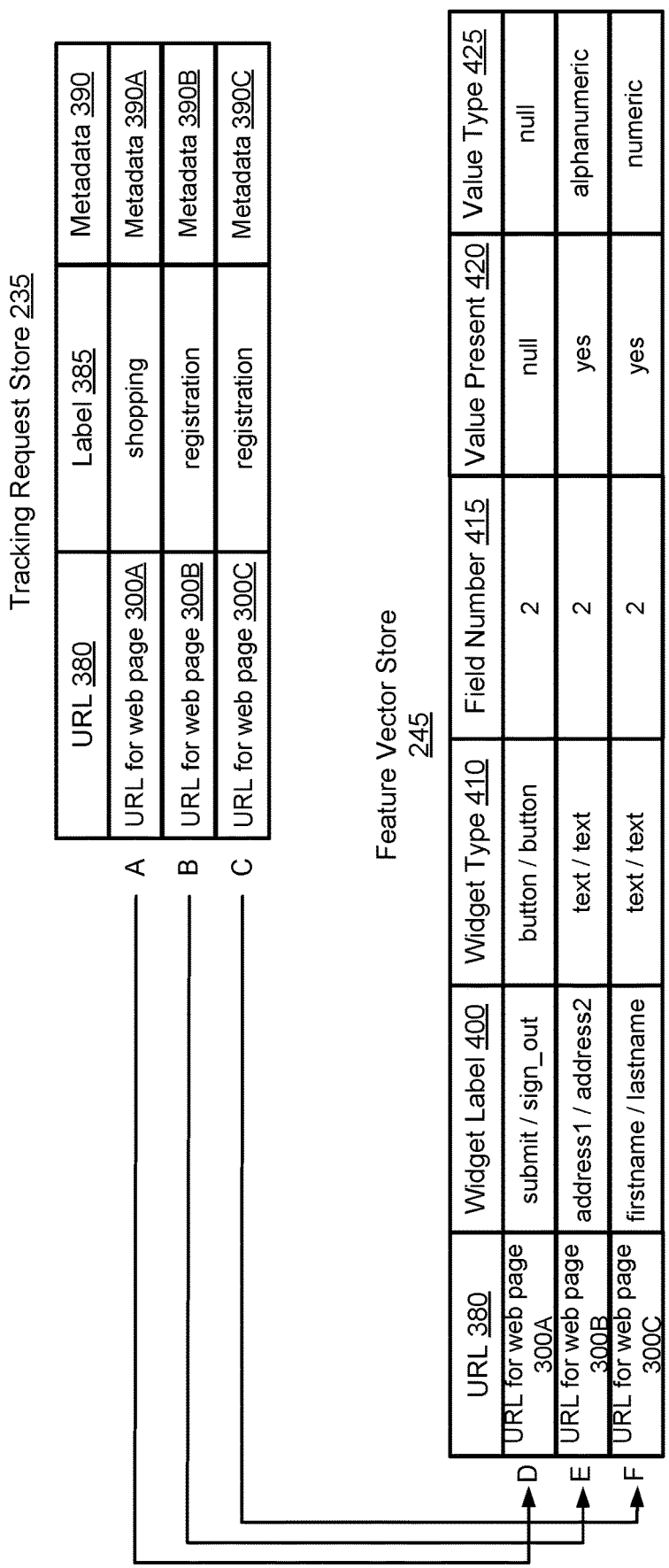
FIG. 4 illustrates an example use case of generating and storing feature vectors, in accordance with an embodiment.

The feature vector store 245 stores feature vectors generated by the feature extraction module 230. In one embodiment, such as that illustrated in FIG. 4, each entry in the feature vector store 245 (e.g., entries D, E, and F) contains information extracted from each tracking request 111 entry in the tracking request store 235. As illustrated, feature vector store 245 entry D contains the URL 380 information as contained in the tracking request 111 to which it corresponds (e.g., tracking request store 235 entry A). However, the feature vector store 245 also includes information derived from the markup language document metadata 390 attributes stored in the tracking request store 235. Each markup language document metadata 390 attribute is extracted by the feature extraction module 230 and unpacked into several features that provide additional context pertaining to the event that triggered the tracking request 111. As illustrated in FIG. 4, features include widget label 400, widget type 410, field number 415, value present 420, and value type 425. The widget label 400 is an element in the markup language document received by the client device 120 that describes a widget displayed on the client device 120 (e.g., password, username, submit, and the like). The widget type 410 indicates to the tracking request label predictor 112 what type, or types, of widgets are displayed on the client device 120 (e.g., text, password, checkbox, radio, button, and the like). The field number 415 describes the number of fields, or widgets, displayed within a web page on the client device 120. Value present 420 indicates in the tracking request 111 whether the user has entered a value, or otherwise interacted with, one or more of the fields displayed on the client device 120. Value type 425 further describes values that may have been entered by the user into the one or more fields (e.g., numeric, alphabetic, a date, and address, and the like). Each of these features provides to the online system 110 additional contextual information describing a tracking request 111. Feature vectors are provided as input into the tracking request label predictor 112, providing it with contextual information that can be used to indicate the accuracy of the label 385 provided in the tracking request store 235.

The tracking request label predictor 112 uses machine learning techniques to train one or more models to predict labels associated with tracking requests 111 received by the online system 110. Machine learning techniques include, for example, linear regression, decision trees, support vector machines, classifiers (e.g., a Naive Bayes classifier), and gradient boosting. The tracking request label predictor 112 takes, as input, feature vectors generated by the feature extraction module 230 and generates, as output, a score indicating a likelihood that labels contained in the feature vectors accurately describe types of web pages.

The tracking request label predictor 112 is trained by the online system 110 using parameters stored in the training data store 240. The training data store 240 maintains previous tracking requests 111 and accurate labels for the tracking requests 111. The tracking requests 111 stored in the training data store 240 include tracking requests 111 representing positive and negative examples for each type of tracking request 111. A positive example for a label 385 includes features that correspond to the label 385 of the web page and a negative example includes features that do not correspond to the label 385 of the web page.

The online system 110 uses the output scores indicating a likelihood for each label type to identify the label most likely to be correct. For example, if the tracking request label predictor 112 provides an output score indicating a 70% likelihood that a web page is a "checkout" web page and a 10% likelihood that the same web page is a "payment" web page, the online system 110 verifies whether the label provided as input in the feature vector matches that with the highest output score. If the labels match, the online system 110 determines that the web page is labeled correctly; if the labels are mismatched, the label with the highest output score is selected as a replacement label for the web page and stored in the label mapping table 250 corresponding to that particular content publishing website 130.

The label mapping table 250 is a data structure maintained by the online system 110 that maps an incorrect label describing a web page type provided by a content publishing website 130 to a correct label generated by the tracking request label predictor 112. In one embodiment, the online system 110 supplies these correct labels to the content publishing website 130 so that the website may update its incorrect labels with correct labels. In another embodiment, if the content publishing website 130 does not update incorrect labels, the online system 110 uses the label mapping table 250 upon receiving a tracking request to map the incoming label and a URL of the webpage that sent the tracking request to the correct label as stored in the label mapping table 250.

The report store 114 stores information describing user actions, or "user action reports," and reports indicating the accuracy of labels describing web page types, or "label accuracy reports," to be provided to content publishing websites 130. The online system 110 uses the label mapping table 250 to generate, both, user action reports and label accuracy reports. User action reports provide the content publishing website 130 with information describing how a user navigates the content publishing web site 130. For example, if the user action report indicates that a user spent a threshold amount of time on a particular checkout web page, it may be determined that the user might have been having difficulty during the checkout process, perhaps due to unintuitive web page layout. Similarly, the label accuracy reports indicate to the content publishing website 130 the accuracy of the labels provided in tracking requests 111. If the content publishing website 130 does not update labels contained therein, these reports may include inaccurate information.

Example Process

FIG. 3 illustrates an example use case of receiving and storing tracking requests, in accordance with an embodiment. In the embodiment illustrated in FIG. 3, each tracking request sent by web pages 300-310 is stored in the tracking request store 235 as a separate entry associated with the same user session (e.g., registration experience). As illustrated in this example use case, web page 300A displays two widgets: submit 335 and sign out 340. This web page contains a tracking pixel 365 that sends a tracking request 111 to the online system 110 as the web page is loaded. The online system receives the tracking request 111 and stores the request in the tracking request store 235.

FIG. 3 and the other figures use like reference numerals to identify like elements. A letter after a reference numeral, such as "300A," indicates that the text refers specifically to the element having that particular reference numeral. A reference numeral in the text without a following letter, such as "300," refers to any or all of the elements in the figures bearing that reference numeral (e.g. "300" in the text refers to reference numerals "300A" and/or "300N" in the figures).

Each tracking request 111 is comprised of a URL 380, a label 385 describing the web page, and markup language document metadata 390 describing widgets displayed on the web page. In FIG. 3, this is illustrated within row A of the tracking request store 235 that includes web page 300A, a label 385 describing web page 300A as a "shopping" web page, and metadata 390A that describes the submit 335 and sign out 340 widgets displayed on the web page.

In addition, web page 300B displays two widgets used to receive the address of a user's home or business enterprise during a registration process: address line 345 and address line 350. Web page 300B also contains a tracking pixel 370 that sends the online system 110 a tracking request 111 as the web page is loaded. The online system receives the tracking request and stores the request in the tracking request store 235. This is shown in FIG. 3 in row B of the tracking request store 235 that contains web page 300B, label 385 that describes web page 300B as a "registration" web page, and metadata B that describes the address line 345 and address line 350 widgets displayed on the web page.

Lastly, web page 300C displays two widgets used to receive a first and last name of a user during a login or registration process: first name 355 and last name 360. Web page 300C also contains an embedded tracking pixel 375 that sends the online system 110 URL 380, label 385, and markup language document metadata 390 information. As illustrated in FIG. 3, row C of the tracking request store 235 includes web page 300C, a label 385 describing web page 300C as a "registration" web page, and metadata 390C describing the first name 355 and last name 360 widgets.

Feature Extraction Process

FIG. 4 illustrates a process by which the feature extraction module 230 generates feature vectors from the entries contained in the tracking request store 235. Like the tracking request store 235, the feature vector store 245 contains tracking request 111 data. However, the feature vector store 245, in addition, contains contextual information derived from the markup language document metadata 390 attributes passed along with the tracking request 111.

For each entry in the tracking request store 235, the feature extraction module 230 generates a feature vector. In the embodiment illustrated in FIG. 4, the feature extraction module 230 propagates the original URL 380 into the feature vector along with additional information derived from the markup language document metadata 390 describing the URL 380. This additional information includes the labels 385 describing widgets displayed on the web page, the type of widgets displayed on the web page, the number of different types of fields displayed on the web page, whether or not a value is present (e.g., entered by a user) in fields displayed on the web page, and, if so, what type of value (e.g., alphabetic, numeric, alphanumeric, and the like) is present in fields displayed on the web page. This is shown in FIG. 4 in the columns titled widget label 400, widget type 410, field number 415, value present 420, and value type 425, respectively. Each feature vector in the feature vector store 245 is sent as input to the tracking request label predictor 112 where it is used to determine the accuracy of the labels 385 describing web pages contained therein.

The tracking request label predictor 112 can use the additional information derived from the markup language document metadata 390 associated with each URL 380 in the feature vector store 245 to determine the accuracy of the labels 385 provided in each tracking request 111. For example, the markup language document metadata 390 contained in row D of the feature vector store 245 indicates that there are two widgets displayed on web page 300A that are buttons labeled "submit" and "sign_out." The tracking request label predictor 112 can use these widget labels 400, in addition to an indication of no value present 420 or value type 425 (e.g., null) contained within the widgets to determine that the label 385 describing the web page as a "shopping" web page may be accurate.

In another example, the widget labels 400 included in row E of the feature vector store 245 indicate that web page 300B displays two widgets that contain fields into which a user can enter text. In addition, row E also indicates that there is a value present 420 in the fields and that the value type 425 is alphanumeric. The tracking request label predictor 112 can use this information to determine the accuracy of the label 385 describing the web page provided by the tracking pixel 370 in web page 300B. In particular, the tracking request label predictor 112 may identify that most addresses contain alphanumeric characters (e.g., 801 California St., Mountain View, Calif. 94041) and that there are values present 420 in the text fields indicating that a user has entered an address. The tracking request label predictor can use this information to determine that the label 385 describing web page 300B as a "registration" web page is most likely accurate.

In yet another example, the metadata associated with web page 300C indicates that the web page includes two text fields labeled "firstname" and "lastname" into which a user has entered values. Upon identifying that the value type entered into the text fields is alphabetic, the tracking request label predictor 112 may determine that the label describing the web page as a "registration" web page is most likely correct as alphabetic values are typically associated with first and last names.

In some embodiments, the feature extraction module 230 determines the type of data for a field based on the markup language document specification of a widget. For example, a widget having a type "text" in the markup language document is determined as having the type alphanumeric, a widget having a type "date" in the markup language document is determined as having the type date or timestamp, a widget having a type radio button in the markup language document is determined as having an enumerated type. In an embodiment, the feature extraction module 230 stores a mapping from types of widgets defined in the markup language to types of data entered in an input field corresponding to the widget. In an embodiment, the feature extraction module 230 determines the type of data entered in a field based on types of data previously determined to have been entered in fields having matching attributes such as name and description. For example, if more than a threshold number of fields named "firstname" and "lastname" were determined to have data type "text" entered in the input field, the feature extraction module 230 associates fields of name "firstname" and "lastname" with data type text (alphabetic). If subsequently, the feature extraction module 230 encounters a web page in which the uses enters data of a different type in the field having the same name, the feature extraction module 230 removes the association between the field name and the data type.

Similarly, a widget may prompt a user for numeric information, such as a credit card number, CVV, date information (e.g., mm/dd/yyyy format), or an appointment time, for example. In this example, the markup language document metadata 390 describing a value type 425 would indicate that a numeric value was entered by a user. The tracking request label predictor 112 can use this information to generate higher output scores for those labels 385 describing web pages that prompt a user for numeric values only, such as check-out web pages that require a credit card number. The tracking request label predictor 112 can subsequently select a predicted label with the highest output score, and use this predicted label as a replacement label in the label mapping table 250 if the label 385 provided by the tracking request 111 does not match the predicted label. The online system 110 can then provide the content provider system 101 with an accuracy report including the replacement label in the label mapping table 250.

Process for Correcting Labels of Tracking Requests

Figure 5:
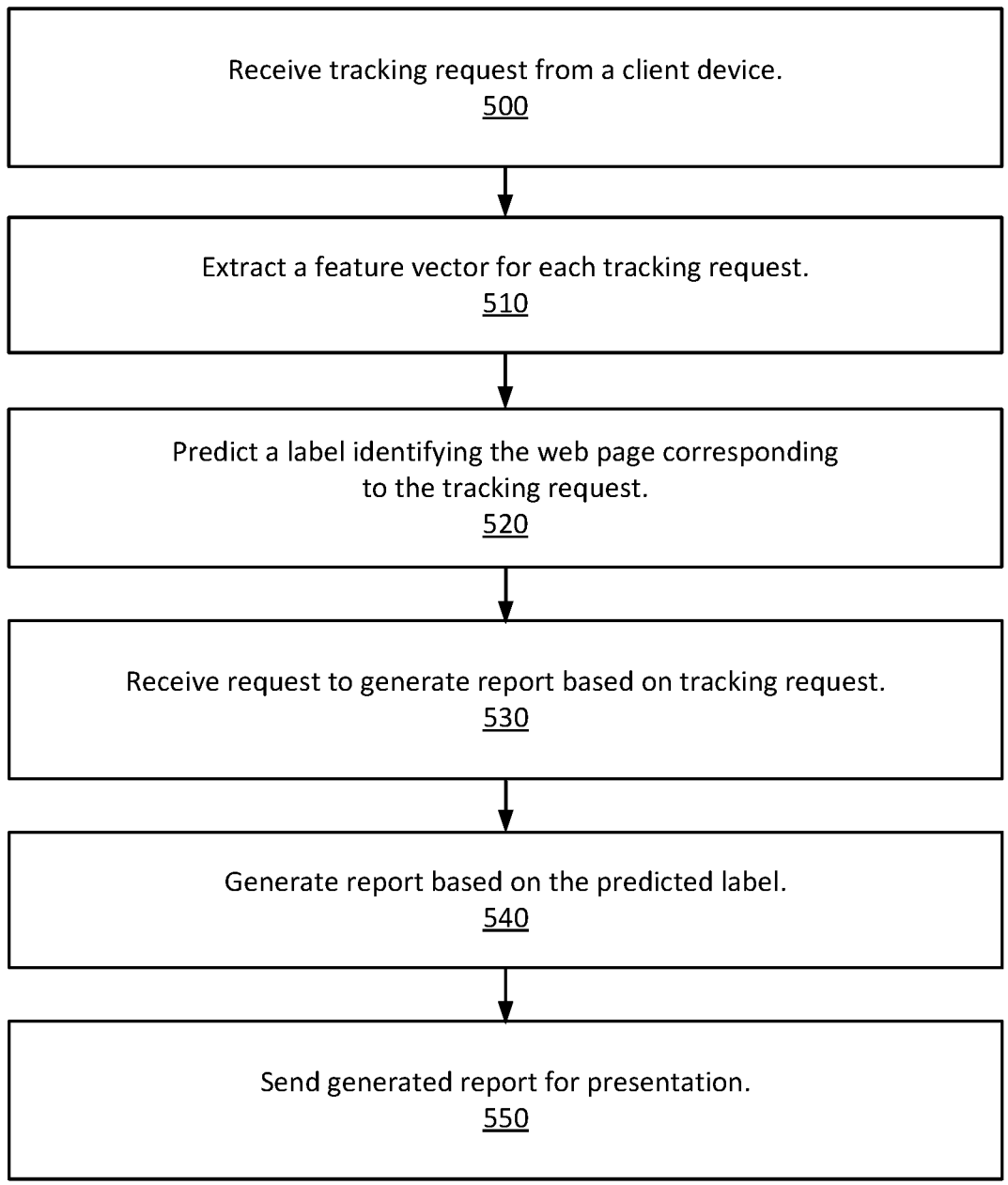
FIG. 5 illustrates a flowchart of the process for determining the quality of tracking requests, in accordance with an embodiment.

FIG. 5 illustrates a process for generating a label accuracy report for a content provider. The online system receives 500 a tracking request from a client device indicating that a web page containing a tracking pixel has been displayed to a user. This tracking request is associated with metadata that the feature extraction module uses to extract 510 feature vectors. The tracking request label predictor predicts 520 a label for the web page corresponding to the tracking request. If the label provided in the tracking request differs from the predicted label produced by the tracking request label predictor, the tracking request label predictor generates a mapping table that maps the label from the tracking request to the predicted label. When the online system receives 530 a request for a label accuracy report from a content provider, the online system generates 540 the requested report containing replacement labels based on the mapping table associated with the content provider. The online system then sends 550 the generated label accuracy report to the content provider.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method comprising:
receiving, by an online system, a plurality of tracking requests from one of more client devices, each tracking request generated responsive to a client device presenting a user interface received by the client device from a third party website, the user interface comprising one or more widgets, each widget associated with one or more metadata attributes;
extracting a feature vector for a tracking request from the plurality of tracking requests, the feature vector comprising features based on the metadata attributes describing the one or more widgets of the user interface corresponding to the tracking request;
predicting a label identifying the web page corresponding to the tracking request, the predicting based on a machine learning model receiving the feature vector as input, the machine learning model configured to generate a score indicating an accuracy with which an input label identifies a web page triggering an input tracking request;
receiving a request to generate a report based on the tracking requests;
generating a report based on the predicted labels corresponding to tracking requests; and
sending the generated report for presentation.

2. The computer-implemented method of claim 1, wherein each of the plurality of requests is associated with a session of the one of more client devices.

3. The computer-implemented method of claim 1, wherein the tracking request is received from the client device responsive to the client device rendering the web page for display, wherein the rendering of the web page causes execution of instructions for sending a tracking request to the online system.

4. The computer-implemented method of claim 1, wherein the metadata attribute describes a field of a widget specified in a markup language document of the web page, wherein the field is one of a label, a name, or a description of the widget.

5. The computer-implemented method of claim 1, wherein the metadata attribute describes whether a predefined regular expression matches a field of a widget specified in a markup language document of the web page, wherein the field is one of a label, a name, or a description of the widget.

6. The computer-implemented method of claim 1, wherein the metadata attribute describes a number of fields of a particular type on the web page.

7. The computer-implemented method of claim 1, wherein the metadata attribute describes whether a field of a particular type was included in the web page.

8. The computer-implemented method of claim 1, wherein the feature vector further comprises a feature describing whether a particular type of field was populated by the user.

9. The computer-implemented method of claim 1, wherein the feature vector further comprises a feature describing a type of value entered by a user in an input field of the web page.

10. The computer-implemented method of claim 1, further comprising:
training the machine learning model using past tracking requests received by the online system, and for each past tracking request, a label describing a web page displayed by the client device causing the tracking request.

11. A non-transitory computer readable storage medium having instructions encoded thereon that, when executed by a processor, cause the processor to perform the steps including:
receiving, by an online system, a plurality of tracking requests from one of more client devices, each tracking request generated responsive to a client device presenting a user interface received by the client device from a third party website, the user interface comprising one or more widgets, each widget associated with one or more metadata attributes;
extracting a feature vector for a tracking request from the plurality of tracking requests, the feature vector comprising features based on the metadata attributes describing the one or more widgets of the user interface corresponding to the tracking request;
predicting a label identifying the web page corresponding to the tracking request, the predicting based on a machine learning model receiving the feature vector as input, the machine learning model configured to generate a score indicating an accuracy with which an input label identifies a web page triggering an input tracking request;
receiving a request to generate a report based on the tracking requests;
generating a report based on the predicted labels corresponding to tracking requests; and
sending the generated report for presentation.

12. The non-transitory computer readable storage medium of claim 11, wherein each of the plurality of requests is associated with a session of the one of more client devices.

13. The non-transitory computer readable storage medium of claim 11, wherein the tracking request is received from the client device responsive to the client device rendering the web page for display, wherein the rendering of the web page causes execution of instructions for sending a tracking request to the online system.

14. The non-transitory computer readable storage medium of claim 11, wherein the metadata attribute describes a field of a widget specified in a markup language document of the web page, wherein the field is one of a label, a name, or a description of the widget.

15. The non-transitory computer readable storage medium of claim 11, wherein the metadata attribute describes whether a predefined regular expression matches a field of a widget specified in a markup language document of the web page, wherein the field is one of a label, a name, or a description of the widget.

16. The non-transitory computer readable storage medium of claim 11, wherein the metadata attribute describes a number of fields of a particular type on the web page.

17. The non-transitory computer readable storage medium of claim 11, wherein the metadata attribute describes whether a field of a particular type was included in the web page.

18. The non-transitory computer readable storage medium of claim 11, wherein the feature vector further comprises a feature describing whether a particular type of field was populated by the user.

19. The non-transitory computer readable storage medium of claim 11, wherein the feature vector further comprises a feature describing a type of value entered by a user in an input field of the web page.

20. The non-transitory computer readable storage medium of claim 11, further comprising:
   training the machine learning model using past tracking requests received by the online system, and for each past tracking request, a label describing a label for a web page displayed by the client device causing the tracking request.

* * * * *